United States Patent [19]  [11] 3,951,827
Burroughs et al.  [45] Apr. 20, 1976

[54] COMPOSITION AND METHOD FOR REMOVING INSOLUBLE SCALE DEPOSITS FROM SURFACES

[75] Inventors: James E. Burroughs, Mount Prospect; James A. Nowak, Glendale Heights, both of Ill.

[73] Assignee: Borg-Warner Corporation, Chicago, Ill.

[22] Filed: Dec. 3, 1973

[21] Appl. No.: 421,017

[52] U.S. Cl. .............................. 252/8.55 B; 166/312; 252/86; 252/87
[51] Int. Cl.$^2$ ...................... C09B 5/02; C09B 5/06; E21B 37/00
[58] Field of Search ................... 252/8.55 B, 80, 86, 252/87; 166/312

[56] References Cited
UNITED STATES PATENTS

| | | | |
|---|---|---|---|
| 2,877,848 | 3/1959 | Case | 252/8.55 X |
| 3,481,400 | 12/1969 | Kerver et al. | 166/279 |
| 3,660,287 | 5/1972 | Quattrini | 252/8.55 |
| 3,684,720 | 8/1972 | Richardson | 252/86 |

FOREIGN PATENTS OR APPLICATIONS 718,380  9/1965  Canada

Primary Examiner—Herbert B. Guynn
Attorney, Agent, or Firm—Richard J. Schlott

[57] ABSTRACT

Compositions comprising aqueous solutions of chelating compounds and synergistic inorganic fluorides are effective agents for removing insoluble scale deposits such as gypsum, anhydrite and precipitated limestone or lime scale from the surfaces contained within oil wells and associated equipment and from the interior surfaces of boilers, heat exchangers and the like.

4 Claims, No Drawings

COMPOSITION AND METHOD FOR REMOVING INSOLUBLE SCALE DEPOSITS FROM SURFACES

BACKGROUND OF THE INVENTION

This invention is directed to the removal of calcium sulfate and/or calcium carbonate scale deposits from the surfaces of oil and gas wells and associated equipment and from the internal surfaces of boilers, heat exchange equipment and the like. More particularly, the invention is directed to a novel composition useful in the treatment of oil and gas wells to remove accumulated water-insoluble scale deposits from the surface of subterranean rock strata, well bore casing, tubing and associated equipment, as well as for the cleaning of boilers and heat exchange equipment.

In oil and gas wells, objectionable calcium sulfate deposits in the form of gypsum accumulate in the pores and channels of the fluid-producing strata and in the well bore equipment such as the tubing, screens, chokes and pumps. These gypsum deposits may also occur in oil field surface equipment including flow lines, separators, and emulsion treaters. The deposits are crystalline masses which adhere tightly to the formations and equipment and, as the masses build up, fluid flow is hindered and finally stopped.

This scale also causes many problems in oil and gas well treating operations, particularly when it builds up in the well tubing. Such scale deposits inhibit the flow of fluids such as oil, water and/or treating fluids through the tubing. If left unchecked, a complete blockage will result.

Removal of calcuim sulfate from wells is difficult, particularly when the scale is in a massive, dense, impermeable form. Removal of such scale is presently accomplished by several methods including scraping and chemical treatment.

One conventional method involves treatment of the scale with a scale converter which converts the scale to an acid-soluble material, followed by treatment with a mineral acid such as HCl. For example, insoluble sulfate scales are generally first reacted with a converter such as a carbonate to yield a water-insoluble—acid soluble carbonate scale which is then treated with a mineral acid.

A second conventional method employs strongly caustic solutions of chelating or sequestering agents, such as ethylenediamine tetraacetic acid or nitrilotriacetic acid. The use of the sequestering agent is conventionally a one-step operation. The sequestering agents act very slowly and require very high pH conditions to dissolve the scale and relatively long well shutdowns are necessary for the treating operation.

In a variation on these methods, a sulfate scale converting solution is used which contains a water soluble converting agent such as a bicarbonate for converting the scale to a more readily-ionizable form, and a chelating agent for dissolving and complexing the converted scale. Scale removal in this instance appears to be facilitated by the concurrent converting and complexing reactions and the action is somewhat improved over the action of the chelating agent alone. Additionally, at least under low pressure conditions, carbon dioxide evolution occurs, causing agitation and apparently giving a mechanical assist to the scale removal. As with the use of sequestering agents alone, this method requires operation under controlled pH conditions. Additionally, where the scale converter employed is a carbonate or bicarbonate, increased corrosion of the iron surfaces of the casing and associated well-bore equipment may occur by way of the well-known carbonate corrosion phenomenon.

In boilers and heat exchange equipment scale buildup of a similar nature forms on the internal surfaces, interfering with efficient heat transfer. Here the insoluble scale formation occurs by way of deposition of the calcium salts normally contained in the hard water employed in these systems. Such scale is frequently referred to as lime or lime scale, though in reality these are calcium sulfates and calcium carbonates, often in association with iron, magnesium and barium salts, frequently also including the insoluble complex hydroxides. Removal of scale is normally accomplished by mechanical means including flushing, and scale removing chemical treatments similar to those employed in oil well treatment are widely used for the purposes of removing lime scale from boilers and heat exchangers.

A scale-removing composition for effecting a rapid removal of scale deposits formed in an oil well bore and associated equipment and from the surfaces contained in boilers, heat exchangers and the like which does not require potentially hazardous and corrosive, strongly caustic solutions and which can significantly improve the effectiveness of conventional chelating and sequestering agents in removing scale is clearly needed.

SUMMARY OF THE INVENTION

This invention may be briefly described as a composition and method useful in the removal of water-insoluble scale deposits from surfaces such as those in an oil well bore and associated well bore equipment and from surfaces contained in boilers, heat exchange equipment and the like. More particularly, the instant invention comprises an aqueous solution of a polyaminocarboxylic acid and a synergistic fluoride salt which is highly effective in removing calcium sulfate deposits such as gypsum and anhydrite and calcium carbonate deposits such as limestone and lime scale from the surfaces of oil well tubing, casing and rock strata as well as from the surfaces of boilers, heat exchangers and the like.

DETAILED DESCRIPTION

The scale-removing composition of this invention generally comprises a water solution containing an effective amount of a polyaminocarboxylic acid chelating agent, a synergistic, water-soluble inorganic fluoride salt, and optionally, surfactants, freezing point depressants and buffering agents, which is adjusted in alkalinity to a pH value in the range 8 to 9 by addition of a suitable base.

Examples of suitable polyaminocarboxylic acid chelating agents are widely known, and include alkylene diamine tetraacetic acids such as ethylenediamine tetraacetic acid (EDTA), and aminotriacetic acids such as nitrilotriacetic acid (NTA), as well as the corresponding ammonium and alkali metal salts. Aqueous solutions of these compounds alone have been employed for scale removal.

The inorganic fluoride salts which are synergistic in effecting scale removal when used with chelating agents and therefore useful in the practice of this invention are the water-soluble alkali metal and ammonium fluorides, in particular, lithium fluoride, sodium fluoride, potassium fluoride and ammonium fluoride, as well as the corresponding acid fluorides, bifluorides, and mixtures thereof. Compounds soluble in water and capable of furnishing fluoride ions may also be employed, including alkali metal fluoroborates.

In prior art compositions synergistic compounds which have been employed with chelating agents, often described as scale converters, have included carbonates, bicarbonates, phosphates oxalates and the like. Their action has been described as one of converting the insoluble scale to a more ionizable or soluble form for reaction with the chelating or sequestering compound. The effectiveness of the inorganic fluorides as synergists is completely unexpected, inasmuch as calcium fluoride has an effective solubility in water on a weight basis less than one one hundredth that of calcium sulfate and less than one half that of calcium carbonate. On solubility grounds, it would be expected that any converting action of the inorganic fluoride would render the scale more insoluble and less readily removed. The action of these inorganic fluorides as synergists in promoting the scale-removing effectiveness is therefore surprising and could not have been predicted from the prior art.

In most instances, the solution should contain at least about 5 weight percent of the chelating compound to be effective, together with greater than about 1 weight percent of the inorganic fluoride salt. While increased concentration tends to promote the rate of dissolution and scale removal, the solubility of the chelating compounds is limited, and aqueous solutions will normally contain no more than about 12 weight percent of the chelating compound. Above about 4 to 5 weight percent of the inorganic fluoride salt, no improvement is noted, and hence, greater concentrations are not preferred. The preferred concentration range of each component is from about 5 weight percent to about 12 weight percent of the chelating compound and from about 1 weight percent to about 5 weight percent of the inorganic fluoride salt. Although even lower concentrations may be somewhat effective, the rate of scale dissolution and removal becomes considerably slower and therefore impractical for most purposes.

The composition of this invention is most effective in removing scale deposits when it is alkaline. More particularly, when the pH of the composition is above a value of about 7, and more preferably in a range of values of from about 8 to 9, the rate of the scale removal is rapid. Below a pH of about 7, the components are not completely soluble, while above about 10, no particular improvement is noted. Adjustment of the pH may be readily accomplished by the addition of a caustic. While any of the common caustics such as alkali metal oxides or ammonium or alkali metal hydroxides may be employed for this purpose, soda lye or sodium hydroxide is conveniently available and may be added either in the solid form or as a concentrated aqueous solution. The precise amount employed to produce the desired pH will of course depend upon the type and amounts of the chelating agent and inorganic fluoride salts.

Alternatively, the pH may be adjusted by addition of an alkaline salt for example alkali metal or ammonium carbonates, phosphates or borates such as sodium carbonate, ammonium carbonate, sodium sesquicarbonate, disodium phosphate, trisodium phosphate, sodium tetraborate and the like. These compounds are sufficiently basic to produce the necessary alkaline condition and have an added advantage in their ability to sufficiently buffer the resulting solution, thereby maintaining the pH in the desired range during the scale-removing reaction. A similar result is produced when a buffer compound is added to the composition after neutralization with caustic. While it is by no means necessary to buffer the system to effect scale removal, buffering may be desirable to maintain the pH of the composition in the most effective range particularly where heavy scale deposits exist and consequently long treatment times are contemplated.

The effectiveness of the compositions of this invention in dissolving and removing scale deposits is demonstrated by the test data in the Table I below. These data report the results of a series of comparative tests run with a variety of compositions and employing gypsum board samples as the test specimen. The weight of the gypsum dissolved is taken as a measure of relative effectiveness of the particular composition.

The test data in Table I were obtained by the following procedure: Squares of one-half inch gypsum board measuring approximately ¼ × ¼ inch were weighed into a 100 ml. beaker, to a total sample weight of six grams. A 50 ml. portion of the "scale remover" formulation was then added to the beaker, and the beaker containing the test mixture was placed in an air oven at 100°F. for 24 hours. A sheet of aluminum foil was loosely placed over the beaker to retard evaporation. The beaker was then removed from the oven and the remaining gypsum board sample was collected by filtration, washed, and then dried at 150°F. for a period of 2 to 3 hours. The cooled sample was then reweighed to determine the weight loss. The weight loss for a series of six such tests is reported in Table I, expressed in the form lbs. of gypsum board dissolved per gallon of "scale remover" employed.

The formulation for each "scale remover" is also given in Table I, where the amounts indicated are expressed in weight percent of the total formulation.

Table I

Testing of Aqueous Inorganic Fluoride - EDTA Mixtures with Gypsum Board Samples

| Example: | 1 | 2 | 3 | 4 | 5 | 6 | 7 | 8 | 9 | 10 | 11 |
|---|---|---|---|---|---|---|---|---|---|---|---|
| EDTA (1) | 10.7 | 10.7 | 10.7 | 10 | 10 | 10 | 10 | 10 | 10 | 10.7 | 10.7 |
| NaF | — | — | 2 | 2 | — | 2 | 1 | 3 | 5 | 2 | 2 |
| NH$_4$F | — | — | — | — | 2 | — | — | — | — | — | — |
| H$_2$O (2) | 82.9 | 82.9 | 82.7 | 82.5 | 81.0 | 82.2 | 83.8 | 81.9 | 79.8 | 79.5 | 79.5 |
| NaOH (3) | 6.4 | 6.4 | 4.6 | 5.0 | 6.5 | 5.3 | 4.7 | 4.6 | 4.7 | — | — |
| Surfactant (4) | — | — | — | 0.5 | 0.5 | 0.5 | 0.5 | 0.5 | 0.5 | 0.5 | 0.5 |
| Na$_2$CO$_3$(Buffer) (5) | — | — | — | — | — | — | — | — | — | 8.3 | — |
| Na$_2$B$_4$O$_7$.10H$_2$O (Buffer) (5) | — | — | — | — | — | — | — | — | — | — | 8.3 |
| pH of mixture | 12.8 | 10.7 | 8.2 | 8.7 | 8.5 | 10.0 | 8.5 | 8.5 | 8.5 | 8.0 | 8.5 |
| Test Results (6) | | | | | | | | | | | |
| Gypsum board dissolved, | 0.48 | 0.24 | .80 | .92 | .88 | .76 | .46 | .62 | .70 | .93 | .90 |

Table I-continued

Testing of Aqueous Inorganic Fluoride - EDTA Mixtures with Gypsum Board Samples

| Example: | 1 | 2 | 3 | 4 | 5 | 6 | 7 | 8 | 9 | 10 | 11 |
|---|---|---|---|---|---|---|---|---|---|---|---|
| lbs/gal | | | | | | | | | | | |

(1) EDTA = Ethylenediamine tetraacetic acid, technical grade, poweder
(2) H₂O = Tap water, except compositions 1,8 and 9 employed deionized water
(3) NaOH = reagent grade pellets
(4) Proprietary alkanolamine surfactant
(5) Sufficient buffering compound added to both neutralize and buffer
(6) Average of three runs It will be apparent from a comparison of Examples 1 and 2 with Examples 3–6 that the addition of inorganic fluoride produces a remarkable increase in the ability of chelating compounds to dissolve gypsum. From the data of Examples 4,5,7,8 and 9, the most effective concentration of inorganic fluoride is about 2 weight percent, with lower levels (Example 7) being ineffective and higher levels (Examples 8 and 9) being less than optimum in their effect. A high pH (Example 6) decreases the effectiveness somewhat, and the most effective pH appears to be in the range of 8 to 9.

In a separate experiment, an attempt was made to prepare the composition of Example No. 4, but without caustic, so that the pH would be 6. The components were insoluble, demonstrating that the compositions of this invention cannot be prepared without adjustment of pH to an alkaline value.

Examples 10 and 11 demonstrate the use of an alkaline salt to adjust pH. Both sodium carbonate and sodium tetraborate are effective buffers, and when used in place of caustic for neutralization produce a composition less sensitive to external sources of acid by virtue of the well-known buffering effect. By comparison of Examples 4, 5, 10 and 11, it will be seen that these buffered mixtures are fully as effective as those neutralized with caustic.

It will also be noted, when compared with Examples 1 and 2, that very high pH levels near 13 are required for solutions containing EDTA alone, but more moderate pH levels are much more effective and efficient for scale dissolution when inorganic fluoride is present in the mixture. This composition is therefore particularly advantageous for field application in that a highly corrosive, strongly caustic solution is no longer necessary, thereby reducing the potential hazard during preparation and use by personnel, and in addition, minimizing the possibility of caustic etching and weakening of metal pipe, tanks, pumps and associated equipment.

A practical test of the instant scale solvent compositions was carried out by measuring the dissolution of actual scale samples collected from oil wells, using the procedure followed for gypsum board tests. The results of this test is reported in Table II as Example No. 12. A comparison of this test with the data reported in Table I shows that an adequate correlation of tests on gypsum board with tests on field samples is realized. For comparison purposes, a test was run with sodium carbonate and EDTA, using no fluoride (Example 13). As the test results show, the synergistic effect of the fluoride compound results in a 17% improvement.

Table II

Testing of Aqueous Borate - EDTA Mixtures with Actual Scale Samples

| Example: | 12 | 13 |
|---|---|---|
| EDTA (1) | 10.5 | 10.5 |
| NaF | 2.0 | — |
| Na₂CO₃ (2) | 10.2 | 10.5 |
| H₂O (3) | 77.1 | 78.5 |
| Surfactant (4) | 0.5 | 0.5 |
| pH | 8.5 | 8.5 |
| Test Results | | |
| Scale dissolved lbs./gal | .79 | .62 |

(1) Technical Grade Ethylenediamine tetraacetic acid
(2) Sufficient amount to both neutralize and buffer
(3) Tap Water
(4) Proprietary alkanolamine surfactant As was said previously, the chelating compound inorganic fluoride compositions of the instant invention are also desirable over the prior art mixtures containing carbonates or bicarbonates. By comparison of Examples 1, 2, 12 and 13 with Examples 4, 10 and 11, it will be apparent that the instant compositions are more effective and efficient scale removers than EDTA alone or EDTA - carbonate mixtures.

The compositions of this invention are most useful for removing calcium sulfate scale from the bore of an oil well. The following illustrative embodiment is provided to demonstrate a typical procedure to be followed in such an application.

Proposed Scale Removal Procedure for Oil Well Use 450 gallons of tap water are placed in a mix tank, together with 2 gallons of an alkanolamine surfactant. The mixture is then agitated while 500 lbs. of technical garde ethylenediamine tetraacetic acid are added, followed by 100 lbs. of technical sodium fluoride. When the solids are dissolved, 500 lbs. of technical grade sodium carbonate hydrate are added slowly with continuous mixing. After all solids are dissolved, the pH is found to be approximately 8.2. A pre-flush of kerosene is normally employed first to clear the well fluids from the area. The treating mixture is pumped into the production tubing of the oil well to substantially fill the tubing and the casing therein below. The well is closed in and the treating solution, optionally capped by pumping in a small slug of kerosene, is allowed to stand for a period of 24 hours. The treating solution is then swabbed from the well, and the well is placed back into production.

The use of well-treating compositions in oil fields often requires the addition of surfactants such as alkanolamines, ethoxylated phenols and the like and fluid-friction reducing compounds such as polyacrylonitrile, polyethylene oxide and the like to meet practical handling requirements, for example, the reduction of interfacial tension, the emulsification of crude oil components present in the well fluid and the increase of the pumpability of the fluid. Additionally, where the well treatments are carried out under extreme weather conditions, it may be necessary to substitute a freezing point depressant such as ethylene glycol for a portion of the water. Such additions and substitutions may be made without markedly affecting the properties of the novel composition of the instant invention and so are contemplated as being within its scope.

Further modifications which lie within the spirit and scope of the present invention will be apparent to those skilled in the art, and the invention is to be limited only by the appended claims.

We claim:

1. A composition useful in the removal of water-insoluble scale deposits from surfaces comprising an aqueous solution containing an effective amount from about 5% to about 12% by weight of the total composition of a chelating compound selected from ammonium and alkali metal salts of polyaminocarboxylic acids and from about 1% to about 5% by weight of the total composition of a synergistic inorganic fluoride salt selected from the group consisting of ammonium and alkali metal fluorides, acid fluorides and mixtures thereof, having a pH greater than 8.

2. The composition of claim 1 wherein the chelating agent is a sodium salt of ethylenediamine tetraacetic acid and the inorganic fluoride salt is sodium fluoride.

3. A composition useful in the removal of water-insoluble scale deposits from surfaces comprising an aqueous solution containing from about 5 weight percent to about 12 weight percent of a compound selected from the group consisting of a sodium salt of ethylenediamine tetraacetic acid and a sodium salt of nitrilotriacetic acid and from about 1 weight percent to about 5 weight percent of an inorganic fluoride salt selected from the group consisting of sodium fluoride and ammonium fluoride, having a pH in the range 8 to 9.

4. A method for removing water-insoluble scale from the surfaces contained within an oil well bore comprising contacting the surfaces with an aqueous solution comprising an effective amount from about 5% to about 12% by weight of the total composition of a chelating agent selected from the group consisting of the alkali metal and ammonium salts of amino polycarboxylic acids, and from about 1% to about 5% by weight of the total composition of an inorganic fluoride salt selected from the group consisting of ammonium and alkali metal fluorides, acid fluorides and mixtures thereof having a pH in the range 8 to 9.

* * * * *